United States Patent
Dean et al.

(10) Patent No.: US 8,762,225 B1
(45) Date of Patent: Jun. 24, 2014

(54) SYSTEMS AND METHODS FOR SCORING DOCUMENTS

(75) Inventors: Jeffrey A. Dean, Palo Alto, CA (US); Lauren Baptist, San Francisco, CA (US); Scott Davies, Sunnyvale, CA (US); Angshuman Guha, Los Gatos, CA (US); Joseph Kieran O'Sullivan, San Francisco, CA (US); Adam M. Smith, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/152,107

(22) Filed: Jun. 2, 2011

Related U.S. Application Data

(62) Division of application No. 10/953,491, filed on Sep. 30, 2004.

(51) Int. Cl.
*G06Q 30/00* (2012.01)

(52) U.S. Cl.
USPC .................... 705/26.64; 705/26.1; 705/26.61; 705/26.62; 705/26.8

(58) Field of Classification Search
USPC ................................................ 705/26.1–27.2
See application file for complete search history.

(56) References Cited

U.S. PATENT DOCUMENTS

| | | | |
|---|---|---|---|
| 5,642,502 A * | 6/1997 | Driscoll | 1/1 |
| 6,285,999 B1 | 9/2001 | Page | |
| 6,775,674 B1 | 8/2004 | Agassi et al. | |
| 7,493,308 B1 | 2/2009 | Bair et al. | |
| 2003/0115097 A1 | 6/2003 | Sokei et al. | |
| 2004/0024752 A1 | 2/2004 | Manber et al. | |
| 2005/0015307 A1 * | 1/2005 | Simpson et al. | 705/26 |
| 2005/0256865 A1 | 11/2005 | Ma et al. | |
| 2006/0004732 A1 | 1/2006 | Odom | |
| 2006/0026206 A1 * | 2/2006 | Loghmani et al. | 707/104.1 |
| 2006/0026534 A1 * | 2/2006 | Ruthfield et al. | 715/854 |
| 2006/0031486 A1 | 2/2006 | Miner | |
| 2006/0282335 A1 * | 12/2006 | Hanks et al. | 705/26 |

OTHER PUBLICATIONS

Checking in with booksellers on Book Sense. Howell, Kevin. Publisher's Weekly; Aug. 2, 1996. Retrieved on Feb. 10, 2014 via Proquest.*
Copending U.S. Appl. No. 10/953,491, filed Sep. 30, 2004 entitled "Systems and Methods for Scoring Documents" by Jeffrey A. Dean et al., 39 pages.

* cited by examiner

*Primary Examiner* — Michael Misiaszek
(74) *Attorney, Agent, or Firm* — Harrity & Harrity, LLP

(57) ABSTRACT

A system generates a score for a document based on best seller list information relating to the document, circulation information relating to the document, publisher sales information relating to a publisher associated with the document, author sales information relating to an author associated with the document, user behavior information relating to access of the document by users, and/or a link-based score of a web document relating to the document.

20 Claims, 6 Drawing Sheets

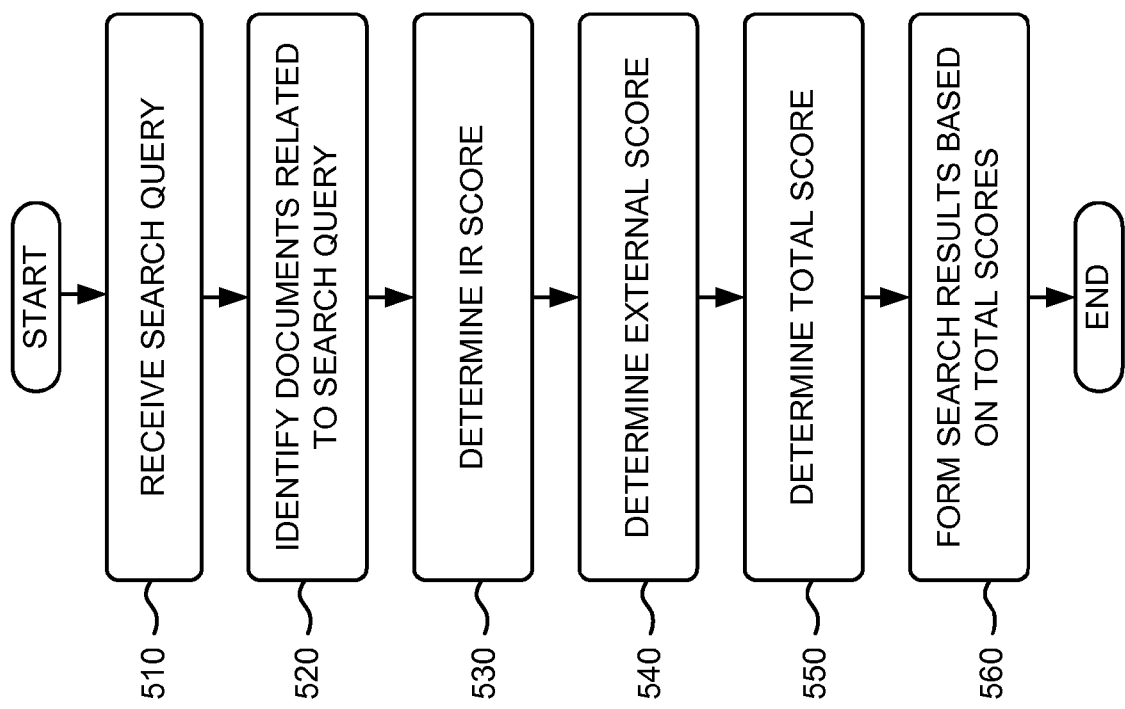

FIG. 6

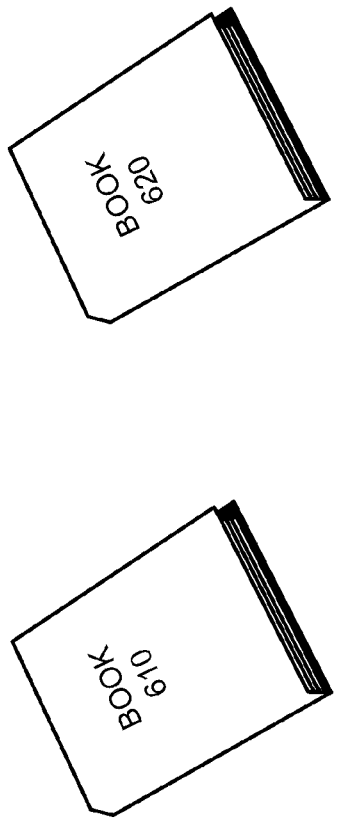

| | BOOK 610 | BOOK 620 |
|---|---|---|
| BEST SELLER LIST INFORMATION | NO. 5 ON BEST SELLER LIST DATED DECEMBER 31, 1998 | NEVER ON BEST SELLER LIST |
| CIRCULATION INFORMATION | 1,000,000 COPIES SOLD | 50,000 COPIES SOLD |
| PUBLISHER SALES INFORMATION | PUBLISHER SOLD 30,000,000 BOOKS | PUBLISHER SOLD 1,000,000 BOOKS |
| AUTHOR SALES INFORMATION | AUTHOR SOLD 4,000,000 BOOKS | AUTHOR SOLD 400,000 BOOKS |
| USER BEHAVIOR INFORMATION | HAS BEEN SELECTED 30,000 TIMES | HAS BEEN SELECTED 100 TIMES |
| LINK-BASED SCORE | 0.4 | 0.1 |

SYSTEMS AND METHODS FOR SCORING DOCUMENTS

RELATED APPLICATION

This application is a Divisional of U.S. patent application Ser. No. 10/953,491, filed Sep. 30, 2004, the entire contents of which are incorporated herein by reference.

BACKGROUND

1. Field of the Invention

Systems and methods consistent with the principles of the invention relate generally to information retrieval and, more particularly, to the scoring of documents.

2. Description of Related Art

The World Wide Web ("web") contains a vast amount of information. Locating a desired portion of the information, however, can be challenging. This problem is compounded because the amount of information on the web and the number of new users inexperienced at web searching are growing rapidly.

Search engines attempt to return hyperlinks to web documents in which a user is interested. Generally, search engines base their determination of the user's interest on search terms (called a search query) entered by the user. The goal of the search engine is to provide high quality, relevant results to the user based on the search query. Typically, the search engine accomplishes this by matching the terms in the search query to a corpus of pre-stored web documents. Web documents that contain the user's search terms are "hits" and are returned to the user as search results.

Some search engines score the search result documents based on the link structure of the documents. This link-based scoring has difficulty when some of the documents have a poor link structure.

SUMMARY

According to one aspect, a method may include determining whether a document corresponds to a book that has appeared in a best seller list and scoring the document based on whether the document corresponds to a book that has appeared in a best seller list.

According to another aspect, a method may include determining a number of copies of a book that have been sold and scoring a document that corresponds to the book based on the number of copies of the book that have been sold.

According to yet another aspect, a method may include identifying a publisher associated with a document, determining a number of documents that the publisher has sold, and scoring the document based on the number of documents that the publisher has sold.

According to a further aspect, a method may include identifying an author associated with a document, determining a number of documents that the author has sold, and scoring the document based on the number of documents that the author has sold.

According to another aspect, a method may include identifying a publisher or author associated with a document, locating a web document associated with the publisher or author, determining a score associated with the web document, and assigning a score to the document based on the determined score.

According to yet another aspect, a method may include generating a first score based on one of best seller list information relating to a document, circulation information relating to the document, publisher sales information relating to a publisher associated with the document, author sales information relating to an author associated with the document, user behavior information relating to access of the document by users, or a link-based score of a web document relating to the document, and generating a second score based on another one of the best seller list information, the circulation information, the publisher sales information, the author sales information, the user behavior information, or the link-based score. The method may also include assigning a score to the document based on the first and second scores.

According to a further aspect, a method may include receiving a search query that includes a search term and identifying a print document related to the search term. The method may also include determining a first score for the print document based on a factor related to the search term, determining a second score for the print document based on a factor unrelated to the search term, and generating a score for the print document based on the first score and the second score. The method may also include providing the print document as a search result based on the generated score.

According to another aspect, a system may include a memory to store a document and a processor to generate a score for the document based on at least one of best seller list information relating to the document, circulation information relating to the document, publisher sales information relating to a publisher associated with the document, author sales information relating to an author associated with the document, user behavior information relating to access of the document by users, or a link-based score of a web document relating to the document.

According to yet another aspect, a method for scoring a document whose content, at least in part, is available both online and offline is provided. The method may include determining an offline signal associated with the document and scoring the document for online search based on the offline signal.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 5 is a flowchart of exemplary processing for presenting search results according to an implementation consistent with the principles of the invention; and FIG. 6 is a diagram of two exemplary books and related external signals.

DETAILED DESCRIPTION

The following detailed description of the invention refers to the accompanying drawings. The same reference numbers in different drawings may identify the same or similar elements. Also, the following detailed description does not limit the invention.

OVERVIEW

More and more types of documents are becoming searchable via search engines. A "document," as the term is used herein, is to be broadly interpreted to include any machine-readable and machine-storable work product. A document may include, for example, an e-mail, a file, a combination of files, one or more files with embedded links to other files, a news group posting, a blog, a web advertisement, etc. In the context of the Internet, a common document is a web page or a web site. Web pages often include textual information and may include embedded information (such as meta information, images, hyperlinks ("links"), etc.) and/or embedded instructions (such as Javascript, etc.). A "link," as the term is used herein, is to be broadly interpreted to include any reference to/from a document from/to another document or another part of the same document.

Some types of documents have a poor link structure. For example, some types of documents may not include a good set of links, such that any link-based scoring of them may not be useful. Examples of these types of documents may include print documents, such as books, magazines, newspapers, articles, catalogs, and other types of documents that have not conventionally been in electronic form, or other forms of media, such as audio recordings, video recordings, and video games. The print documents may be scanned or otherwise obtained in electronic form and possibly processed using optical character recognition (OCR).

Systems and methods consistent with the principles of the invention may score documents based on external signals, such as circulation signals, publisher and/or author related signals, user behavior signals, and/or signals associated with related web pages and/or web sites, to facilitate the scoring of the documents.

Exemplary Information Retrieval Network

Figure 1:
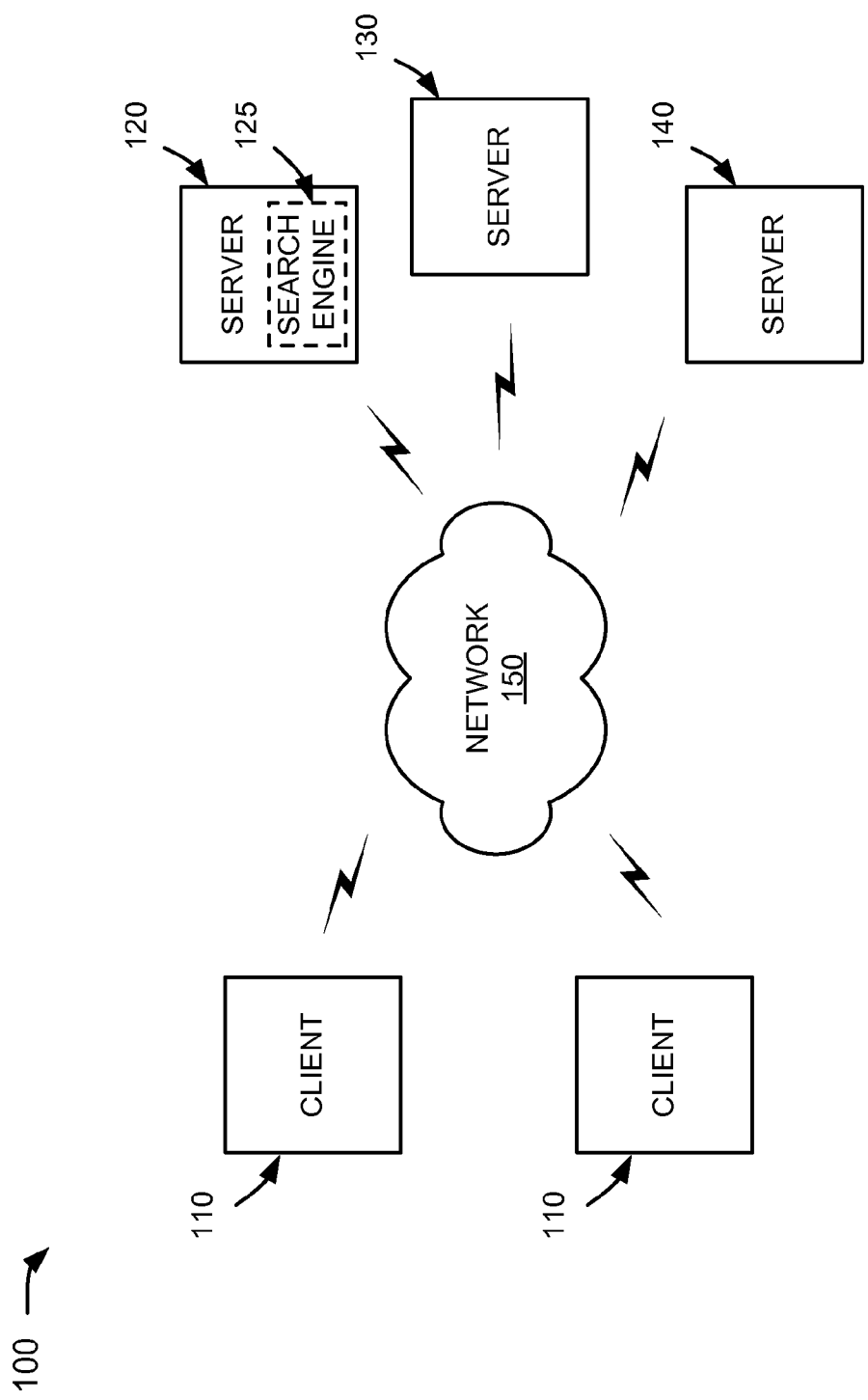
FIG. 1 is a diagram of an exemplary information retrieval network in which systems and methods consistent with the principles of the invention may be implemented.

FIG. 1 is an exemplary diagram of a network 100 in which systems and methods consistent with the principles of the invention may be implemented. Network 100 may include multiple clients 110 connected to multiple servers 120-140 via a network 150. Network 150 may include a local area network (LAN), a wide area network (WAN), a telephone network, such as the Public Switched Telephone Network (PSTN), an intranet, the Internet, a memory device, or a combination of networks. Two clients 110 and three servers 120-140 have been illustrated as connected to network 150 for simplicity. In practice, there may be more or fewer clients and servers. Also, in some instances, a client may perform the functions of a server and/or a server may perform the functions of a client.

Clients 110 may include client entities. An entity may be defined as a device, such as a personal computer, a wireless telephone, a personal digital assistant (PDA), a lap top, or another type of computation or communication device, a thread or process running on one of these devices, and/or an object executable by one of these devices. Servers 120-140 may include server entities that gather, process, search, and/or maintain documents in a manner consistent with the principles of the invention. Clients 110 and servers 120-140 may connect to network 150 via wired, wireless, and/or optical connections.

In an implementation consistent with the principles of the invention, server 120 may include a search engine 125 usable by clients 110. Server 120 may identify a corpus of documents (e.g., via scanning or crawling), index the documents, and store information associated with the documents in a repository of documents. Servers 130 and 140 may store or maintain documents, such as web pages or web sites. While servers 120-140 are shown as separate entities, it may be possible for one or more of servers 120-140 to perform one or more of the functions of another one or more of servers 120-140. For example, it may be possible that two or more of servers 120-140 are implemented as a single server. It may also be possible for a single one of servers 120-140 to be implemented as two or more separate (and possibly distributed) devices.

Exemplary Client/Server Architecture

Figure 2:
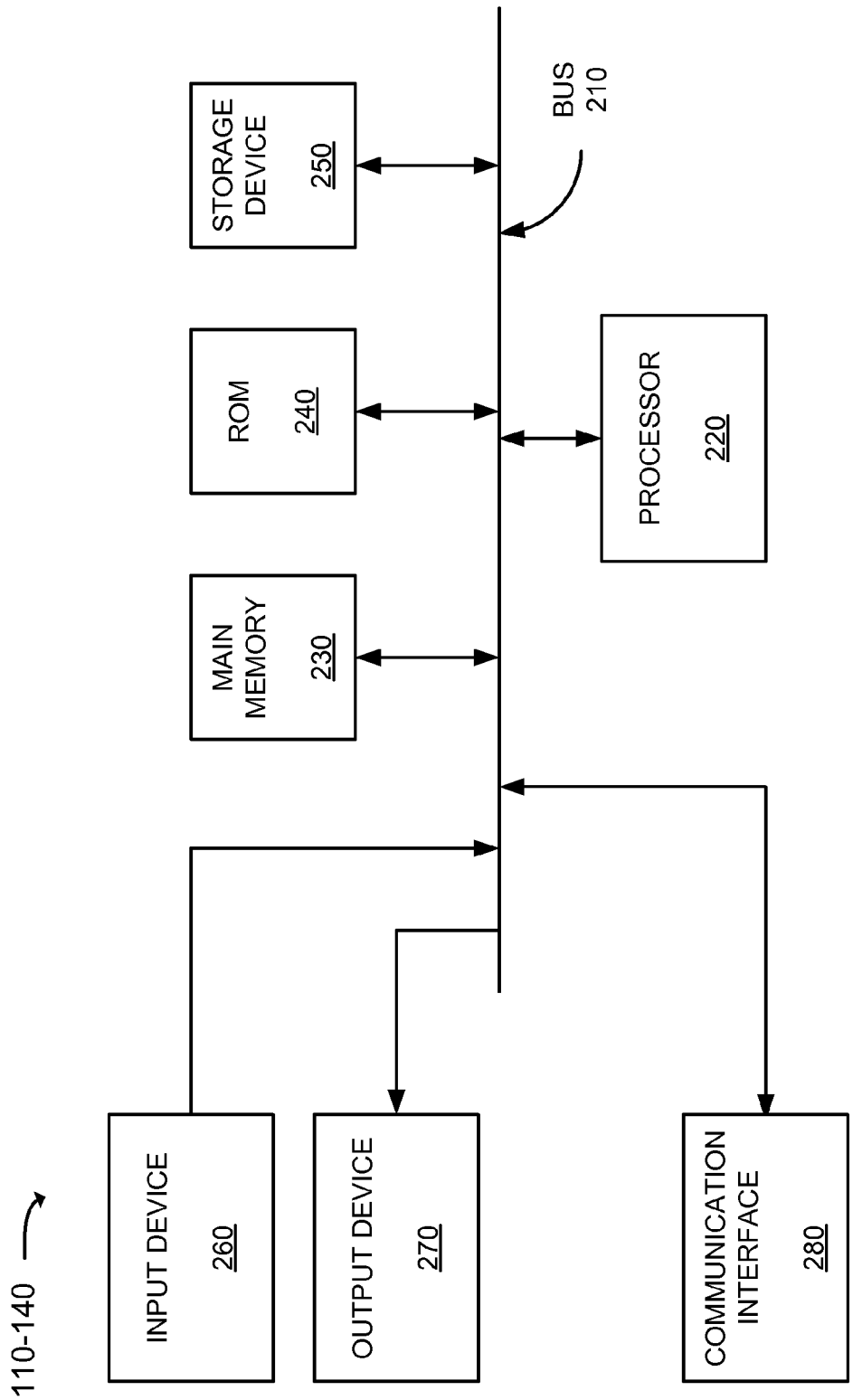
FIG. 2 is an exemplary diagram of a client or server according to an implementation consistent with the principles of the invention.

FIG. 2 is an exemplary diagram of a client or server entity (hereinafter called "client/server entity"), which may correspond to one or more of clients 110 and servers 120-140, according to an implementation consistent with the principles of the invention. The client/server entity may include a bus 210, a processor 220, a main memory 230, a read only memory (ROM) 240, a storage device 250, an input device 260, an output device 270, and a communication interface 280. Bus 210 may include a path that permits communication among the elements of the client/server entity.

Processor 220 may include a conventional processor, microprocessor, or processing logic that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device 260 may include a conventional mechanism that permits an operator to input information to the client/server entity, such as a keyboard, a mouse, a pen, voice recognition and/or biometric mechanisms, etc. Output device 270 may include a conventional mechanism that outputs information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 150.

As will be described in detail below, the client/server entity, consistent with the principles of the invention, may perform certain searching-related operations. The client/server entity may perform these operations in response to processor 220 executing software instructions contained in a computer-readable medium, such as memory 230. A computer-readable medium may be defined as a physical or logical memory device and/or carrier wave.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary External Score Generating Unit

Figure 3:
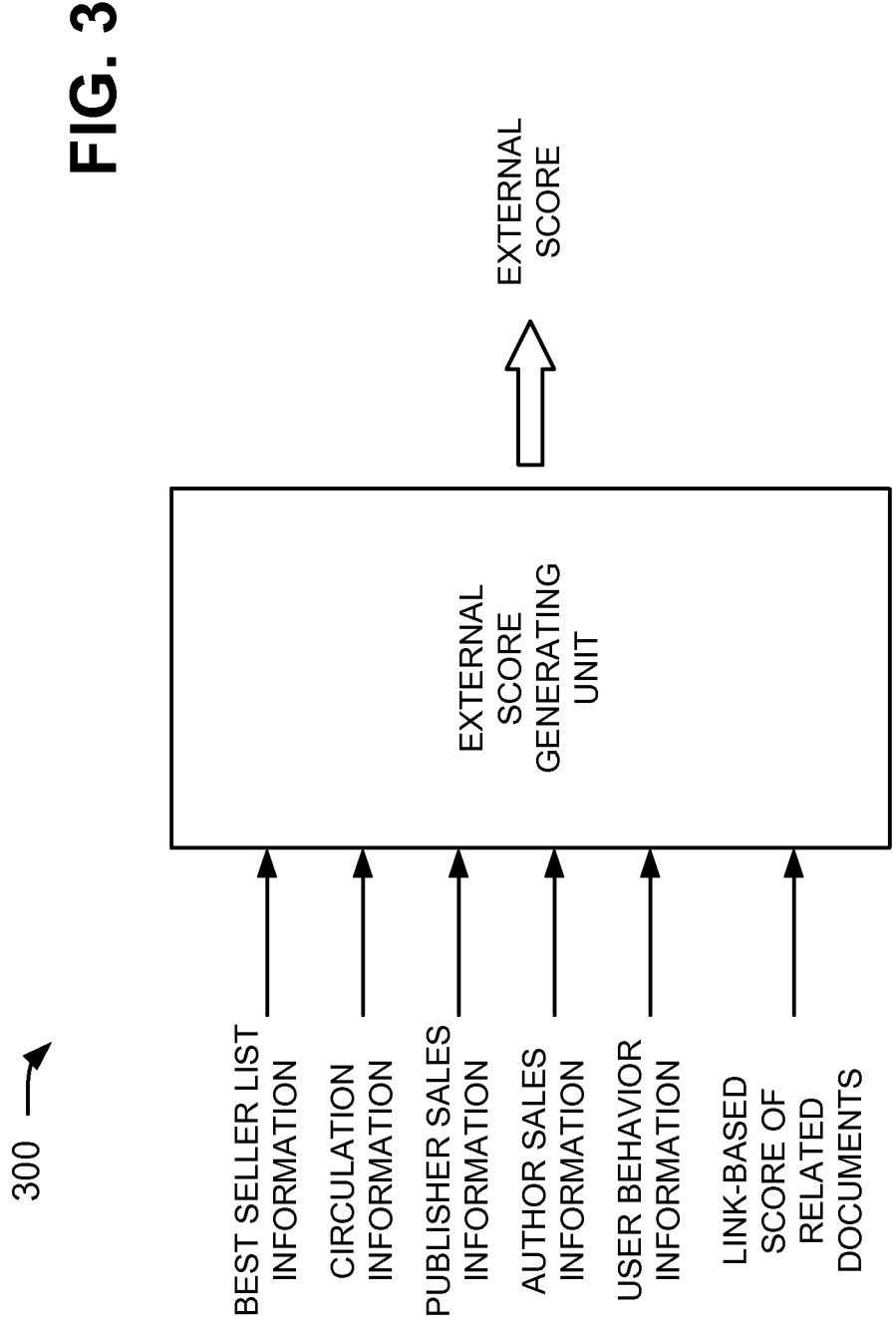
FIG. 3 is an exemplary functional block diagram of an external score generating unit according to an implementation consistent with the principles of the invention.

FIG. 3 is an exemplary functional block diagram of an external score generating unit 300 according to an implementation consistent with the principles of the invention. According to one implementation, one or more of the functions of external score generating unit 300 described below may be performed by server 120 or an entity separate from server 120, such as a computer associated with server 120 or one of servers 130 or 140.

External score generating unit 300 may operate upon external signals relating to one or more attributes (e.g., title, author, category/subject matter, publisher, publication date, etc.) associated with a document to generate an external score for the document that may be subsequently used to rank a document. The external signals may be unrelated to any search query or search terms. Some of the external signals may be referred to as "offline signals" because they relate to one or more attributes associated with the print version of a document, but not the online version of the document. The particular external signals used by external score generating unit 300 may vary. Examples of some external signals are shown in FIG. 3.

For example, the external signals might include best seller list information. The best seller list information may include information regarding documents included in a best seller list, such as the best seller lists available from the New York Times, USA Today, Bestseller Almanac, and other sources of best seller lists. Best seller list information may be used for a predetermined time period, such as the last 10, 20, 30, 40, 50, etc. years. External score generating unit 300 may use the best seller list information to score documents. For example, documents that are included on a best seller list may be scored higher than documents that are not on a best seller list. Alternatively or additionally, documents that are ranked higher (closer to the top spot) on a best seller list may be scored higher than documents that are ranked lower on a best seller list.

The external signals might include circulation information. The circulation information may include information regarding the number of copies of documents that have been sold. This information may be available from the publisher or other sources. External score generating unit 300 may use the circulation information to score documents. For example, documents that have a greater circulation may be scored higher than documents that have a smaller circulation. Alternatively or additionally, documents that have a more widespread circulation geographically (e.g., copies sold nationally) may be scored higher than documents that have a less widespread circulation geographically (e.g., most copies sold in a particular geographic region).

The external signals might include publisher sales information. The publisher sales information may include information regarding the number of documents that publishers have sold. This information may be available from the publishers themselves or other sources. External score generating unit 300 may use the publisher sales information to score documents. For example, documents associated with publishers with a greater number of document sales may be scored higher than documents associated with publishers with a smaller number of document sales. Alternatively or additionally, documents associated with publishers whose sales are more widespread geographically (e.g., documents sold nationally) may be scored higher than documents associated with publishers whose sales are less widespread geographically (e.g., most documents sold in a particular geographic region).

The external signals might include author sales information. The author sales information may include information regarding the number of documents that authors have sold. This information may be available from the publishers, best seller lists, or other sources. External score generating unit 300 may use the author sales information to score documents. For example, documents by authors who appear on a best seller list may be scored higher than documents by authors who do not appear on a best seller list. Alternatively or additionally, documents by authors who appear higher (closer to the top spot) on a best seller list may be scored higher than documents by authors who appear lower on a best seller list. Alternatively or additionally, documents by authors with a greater number of document sales may be scored higher than documents by authors with a smaller number of document sales. Alternatively or additionally, documents by authors whose sales are more widespread geographically (e.g., documents sold nationally) may be scored higher than documents by authors whose sales are less widespread geographically (e.g., most documents sold in a particular geographic region).

The external signals might include user behavior information. The user behavior information may include information regarding the number of times that a document is accessed or selected from a set of search results and/or the amount of time that users spend accessing the document. This information may be available from a server, a client, or other sources. External score generating unit 300 may use the user behavior information to score documents. For example, documents that were accessed more often or that users spent more time accessing may be scored higher than documents that were accessed less often or that users spent less time accessing.

The external signals might include link-based scores of related documents. A related document may include an associated publishers' web page or web site. For example, the publisher or author associated with a book may be identified and a web page or web site (or set of web pages or web sites) associated with the publisher/author may be located. The link-based score of the web page(s) or web site(s) associated with the publisher/author may then be used as the link-based score of the book. Several techniques exist for determining the link-based score of a web page or web site. One such technique is described in U.S. Pat. No. 6,285,999, entitled "METHOD FOR NODE RANKING IN A LINKED DATABASE," the contents of which are incorporated by reference. A related document might also include a web page or web site associated with the document. For example, a book title may be searched to identify a web page or web site that is associated with the book. The link-based score of the associated web page or web site (or a set of web pages or web sites) may then be used as the link-based score of the book.

Any or all of the above-identified signals may be influenced by user location information. For example, user location information may influence how the circulation information is used. If the user is located in the United States, for example, circulation information regarding the number of copies of documents that were sold in the United States may be used rather than, or weighted more than, circulation information regarding the number of copies of the documents that were sold in other countries. Also, if the circulation information indicates that most of the copies of a document were sold within a particular geographic region, then the circulation information may be weighted more if the user is in that geographic region and less if the user is not in that geographic region.

Similarly, user location information may influence how the publisher or author ("publisher/author") sales information is used. If the user is located in the United States, for example, publisher/author sales information regarding documents that were sold in the United States may be used rather than, or weighted more than, publisher/author sales information regarding documents that were sold in other countries. Also, if the publisher/author sales information indicates that most of the documents were sold within a particular geographic region, then the publisher/author sales information may be weighted more if the user is in that geographic region and less if the user is not in that geographic region.

Likewise, user location information may influence how the user behavior information is used. If the user is located in United States, for example, user behavior information regarding documents that were accessed by other users in United States may be used rather than, or weighted more than, user behavior information regarding documents that were accessed by users in other countries.

External score generating unit 300 may generate an external score based on any or all of the above-described external signals. In one implementation, external score generating unit 300 may combine the scores generated based on the above-described external signals in some manner, such as by normalizing the scores (if necessary) and adding the scores or determining an average of the scores. Optionally, external score generating unit 300 might weight ones of the scores differently than other ones of the scores.

Exemplary Search Engine

Figure 4:
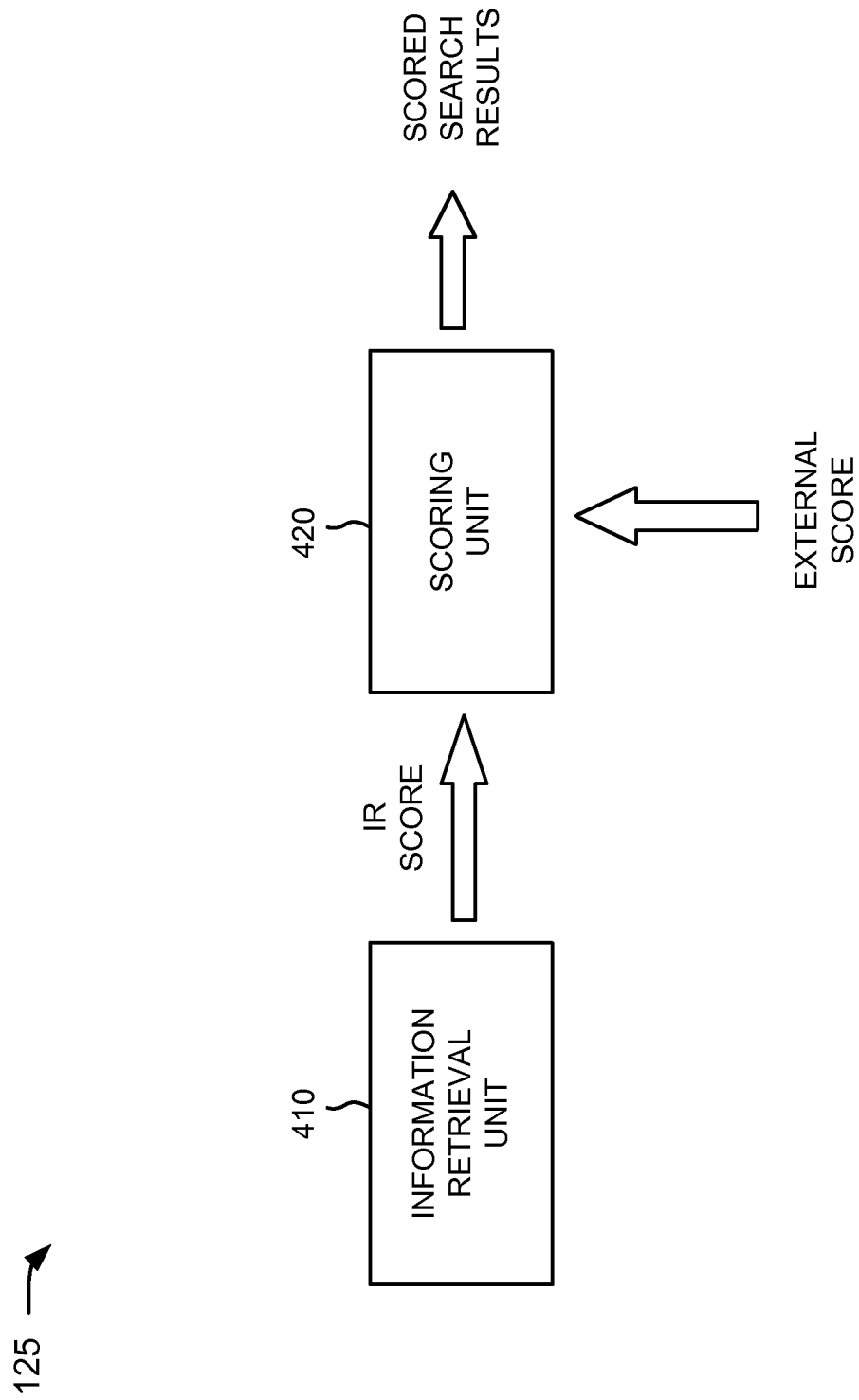
FIG. 4 is an exemplary functional block diagram of the search engine of FIG. 1 according to an implementation consistent with the principles of the invention.

FIG. 4 is an exemplary functional block diagram of a search engine, such as search engine 125 (FIG. 1), according to an implementation consistent with the principles of the invention. According to one implementation, one or more of the functions described below may be performed by another portion of server 120 or an entity separate from server 120, such as a computer associated with server 120 or one of servers 130 or 140.

Search engine 125 may include information retrieval unit 410 and scoring unit 420. Information retrieval unit 410 may operate upon user search terms (e.g., apply the search terms to a web search engine index) to identify documents that are relevant to the terms. There are a number of known techniques that information retrieval unit 410 may use to identify documents related to a set of search terms. For example, when the set of search terms includes a single search term, information retrieval unit 410 might identify documents that contain the search term. When the set of search terms includes multiple search terms, information retrieval unit 410 might identify documents that contain the search terms as a phrase. Alternatively or additionally, information retrieval unit 410 might identify documents that contain the search terms, but not necessarily together. Alternatively or additionally, information retrieval unit 410 might identify documents that contain less than all of the search terms, or synonyms of the search terms. Yet other techniques for identifying relevant documents are known to those skilled in the art.

Information retrieval unit 410 might generate an information retrieval (IR) score for the identified documents. The IR score associated with a document may be based on one or more online signals (i.e., information associated with the document's online experience). There are a number of known techniques that information retrieval unit 410 may use to generate an IR score for a document. For example, information retrieval unit 410 may generate an IR score based on the number of occurrences of the search terms in the document. Alternatively or additionally, information retrieval unit 410 may generate an IR score based on where the search terms occur within the document (e.g., title, content, footer, header, etc.) or characteristics of the search terms (e.g., font, size, color, etc.). Alternatively or additionally, information retrieval unit 410 may weight a search term differently from another search term when multiple search terms are present. Alternatively or additionally, information retrieval unit 410 may consider the proximity of the search terms when multiple search terms are present. Yet other techniques for generating an IR score for a document are known to those skilled in the art.

Scoring unit 420 may generate total scores for the documents based on the IR scores generated by information retrieval unit 410 and the external scores generated by external score generating unit 300 (FIG. 3). In one implementation, scoring unit 420 may combine the IR score with the external score according to the following:

$$\text{TOTAL SCORE}(x) = \alpha \cdot \text{IR SCORE}(x) + \beta \cdot \text{EXTERNAL SCORE}(x),$$

where x refers to a document under consideration, α refers to a weighting function (or constant), and β refers to another weighting function (or constant). Weighting functions/constants α and β may be used to increase and/or decrease the importance of the IR score and/or the external score with regard to one another. Scoring unit 420 may provide the scored documents as scored search results.

Exemplary Processing

FIG. 5 is a flowchart of exemplary processing for presenting search results according to an implementation consistent with the principles of the invention. Processing may begin with a user providing search terms as a search query for searching a document corpus. In one implementation, the document corpus includes documents available from the Internet and the vehicle for searching this corpus is a search engine, such as search engine 125 (FIG. 1). The user may provide the search query via web browser software on a client, such as client 110 (FIG. 1). The search engine may apply the search query to a web search engine index.

The search query may be received by the search engine and used to identify documents (e.g., books, magazines, newspapers, articles, catalogs, etc.) related to the search query (acts 510 and 520). A number of techniques exist for identifying documents related to a search query. One such technique might include identifying documents that contain the search terms as a phrase. Another technique might include identifying documents that contain the search terms, but not necessarily together. Other techniques might include identifying documents that contain less than all of the search terms, or synonyms of the search terms. Yet other techniques are known to those skilled in the art.

An IR score may be determined for the documents (act 530). A number of techniques exist for generating an IR score for a document. One such technique might include generating an IR score based on the number of occurrences of the search terms in the document. Another technique might include generating an IR score based on where the search terms occur within the document (e.g., title, content, footer, header, etc.) or characteristics of the search terms (e.g., font, size, color, etc.). Yet another technique might include weighting a search term differently from another search term when multiple search terms are present. A further technique might include considering the proximity of the search terms when multiple search terms are present. Yet other techniques are known to those skilled in the art.

An external score may be determined for the documents (act 540). The external score for a document may be generated based on an external signal, or a combination of external signals, as described in detail above. In one implementation, the external score for a document is pre-calculated ahead of time and stored. In this case, the external score may be determined by looking up the score. In another implementation, the external score may be determined on-the-fly.

A total score may then be determined for the documents based on a combination of the IR score and the external score (act 550). One way of combining the IR score and external score for a document has been described above. In other implementations, the IR score and external score may be combined in other ways.

Search results may then be formed based on the documents and their total scores (act 560). The search results might include representations (e.g., links, snippets, etc.) associated with the documents. In one implementation, a number of top scoring documents may be included in the search results. In another implementation, documents with scores under a predetermined threshold may be discarded and the remaining documents may be included in the search results. In a further implementation, all of the documents may be included in the search results. In other implementations, other techniques for forming the search results may be used.

The search results may be sorted based on their scores. The search results may be provided as a HTML document, similar to search results provided by conventional search engines. Alternatively, the search results may be provided according to a format agreed upon by the search engine and the client (e.g., Extensible Markup Language (XML)).

Along with the search results, a set of advertisements may be provided. An advertisement may be identified, selected, scored, or priced based on an external signal, or a combination of external signals, associated with a document, or a set of documents, included in the search results.

EXAMPLE

FIG. 6 is a diagram of two exemplary books and related external signals. Assume that a search query includes the terms "yellow submarine." Assume further that books 610 and 620 are identified as relevant to the search query and have equal IR scores. Book 610 relates to the Beetles and book 620 relates to submarines in World War II.

Assume that certain external signals are associated with books 610 and 620. The external signals associated with book 610 may indicate that book 610 was ranked number five on a best seller list on Dec. 31, 1998; there were one million copies of book 610 sold; that the publisher of book 610 has sold thirty million books; that the author of book 610 has sold four million books; that book 610 has been selected thirty thousand times when included in search results; and the link-based score of a web page associated with book 610 is 0.4. The external signals associated with book 620 may indicate that book 620 was never on a best seller list; there were fifty thousand copies of book 620 sold; that the publisher of book 620 has sold one million books; that the author of book 620 has sold four hundred thousand books; that book 620 has been selected one hundred times when included in search results; and the link-based score of a web page associated with book 620 is 0.1.

With regard to best seller list information, book 610 may score higher than book 620 because book 610 was included on a best seller list and book 620 was not. With regard to circulation information, book 610 may score higher than book 620 because there were more copies of book 610 sold than book 620. With regard to publisher sales information, book 610 may score higher than book 620 because the publisher of book 610 has sold thirty million books compared to the one million books sold by the publisher of book 620. With regard to author sales information, book 610 may score higher than book 620 because the author of book 610 has sold four million books compared to the four hundred thousand books sold by the author of book 620. With regard to user behavior information, book 610 may score higher than book 620 because more users selected book 610 than book 620 when included in search results. With regard to link-based score, book 610 may score higher than book 620 because a web page associated with book 610 obtained a higher link-based score than a web page associated with book 620.

The external score for book 610 may be higher than the external score for book 620 because book 610 outscored book 620 in the score generated for each of the external signals. Because the IR scores for books 610 and 620 are the same, the total score generated for book 610 would be higher than the total score generated for book 620. Books 610 and 620 may then be ranked accordingly and presented as results of the search query.

CONCLUSION

Systems and methods consistent with the principles of the invention may help generate scores for documents that have a poor link structure.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts have been described with regard to FIG. 5, the order of the acts may be modified in other implementations consistent with the principles of the invention. Further, non-dependent acts may be performed in parallel.

In one implementation, server 120 may perform most, if not all, of the acts described with regard to the processing of FIG. 5. In another implementation consistent with the principles of the invention, one or more, or all, of the acts may be performed by another entity, such as another server 130 and/or 140 or client 110.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system comprising:
one or more processors to:
receive a search query that includes a search term;
identify a first document related to the search term;
determine a first score for the first document based on a factor related to the search term;
determine that the first document corresponds to a book that has appeared in a best seller list,
the best seller list including a list of books that have been purchased a greater number of times than other books in a particular time period;
determine a location from which the search query is received;
determine a second score for the first document based on the first document corresponding to a book that has appeared in a best seller list in the location from which the search query is received,
the second score being higher than a particular score based on the first document corresponding to the book that has appeared in the best seller list in the location from which the search query is received,
the particular score being for a second document that appears on another best seller list in another location that does not match the location from which the search query is received;
generate a combined score for the first document based on the first score and the second score; and
provide information associated with the first document as a search result based on the generated combined score.

2. The system of claim 1, where, when determining the second score for the first document, the one or more processors are further to:
assign the second score to the first document that is higher than a second score assigned to a third document based on the first document corresponding to the book that has appeared in the best seller list and the third document corresponding to a book that has never appeared in a best seller list.

3. The system of claim 1, where, when determining the second score for the first document, the one or more processors are further to:
assign the second score to the first document that is higher than a second score assigned to a third document based on the first document corresponding to the book that has appeared higher in the best seller list than a book corresponding to the third document.

4. A method comprising:
receiving, by one or more devices, a search query that includes a search term;
determining, by the one or more devices, a location from which the search query is received;
identifying, by the one or more devices, a print document related to the search term;
determining, by the one or more devices, a first score for the print document based on a factor related to the search term;
determining, by the one or more devices, that the print document has appeared on a best seller list in the location from which the search query is received;
determining, by the one or more devices, a second score for the print document based on the print document appearing on the best seller list in the location from which the search query is received,
the best seller list including a list of print documents that have been purchased a greater number of times than other print documents in a particular time period;
generating, by the one or more devices, a score for the print document based on the first score and the second score; and
providing, by the one or more devices, information associated with the print document as a search result based on the generated score.

5. The method of claim 4, where the factor related to the search term includes at least one of:
a number of occurrences of the search term within the print document,
a location of the search term within the print document, or
a characteristic of the search term within the print document.

6. The method of claim 4, where the second score is further based on at least one of:
circulation information relating to the print document, publisher sales information relating to a publisher associated with the print document, author sales information relating to an author associated with the print document, information relating to accesses associated with the print document, or a link-based score of a web document relating to the print document.

7. The method of claim 4, where the second score is further based on circulation information that relates to a number of copies of the print document that have been sold.

8. The method of claim 4, where the second score is further based on publisher sales information that relates to a number of print documents that a publisher of the print document has sold.

9. The method of 4, where the second score is further based on author sales information that relates to a number of print documents that an author of the print document has sold.

10. The method of claim 4, where the second score is further based on information that relates to at least one of a number of times that the print document was accessed or an amount of time spent accessing the print document.

11. A system comprising:
one or more processors to:
receive a search term;
determine a location from which the search query is received;
perform a search to locate a book related to the search term;
determine a first score for the book based on a factor related to the search term;
determine a second score for the book based on the location from which the search query is received, and a best seller list,
the second score being higher when the best seller list includes the book and is for a location that matches the location from which the search query is received than when the best seller list is for a location that is different from the location from which the search query is received;
assign a score to the book based on a combination of the first score and the second score; and
provide the book as a search result based on the assigned score.

12. The system of claim 11, where the factor related to the search term includes at least one of:
a number of occurrences of the search term within the book,
a location of the search term within the book, or
a characteristic of the search term within the book.

13. The system of claim 11, where the second score is further based on at least one of:
   access information relating to accesses associated with the book by users, or
   a link-based score of a web document relating to the book.

14. The system of claim 11, where the second score is further based on circulation information that relates to a number of copies of the book that have been sold.

15. The system of claim 11, where the second score is further based on publisher sales information that relates to a number of books that the publisher has sold.

16. The system of claim 11, where the second score is further based on author sales information that relates to a number of books that the author has sold.

17. The system of claim 11, where the second score is further based on access information that relates to at least one of a number of times that the book was accessed by users.

18. The system of claim 1, where the second score is further based on circulation information that relates to a number of copies of the document that have been sold.

19. The system of claim 1, where the second score is further based on access information that relates to at least one of a number of times that the book was accessed by users.

20. The system of claim 1, where the second score is further based on author sales information that relates to a number of documents that an author of the document has sold.

\* \* \* \* \*